United States Patent [19]
LaVier

[11] 3,768,671
[45] Oct. 30, 1973

[54] LOADING DEVICE
[76] Inventor: Gordon LaVier, 4963 Marshall S.E., Grand Rapids, Mich. 49508
[22] Filed: Aug. 20, 1971
[21] Appl. No.: 173,582

[52] U.S. Cl. ............................... 214/77 R, 214/515
[51] Int. Cl. ............................................. B60p 1/48
[58] Field of Search ...................... 214/77 R, 78, 80, 214/75 R, 75 G, 75 H, 515

[56] References Cited
UNITED STATES PATENTS

| | | | |
|---|---|---|---|
| 2,758,730 | 8/1956 | Tapp et al. | 214/77 R |
| 2,739,720 | 3/1956 | Mackaness et al. | 214/77 R |
| 3,448,874 | 6/1969 | Martinson | 214/77 R X |
| 3,606,044 | 9/1971 | Goldhofer | 214/77 R |
| 3,495,726 | 2/1970 | Goldhofer | 214/77 R |
| 2,567,178 | 9/1951 | Bird | 214/77 R |
| 893,491 | 7/1908 | Hansen | 214/77 R |
| 3,109,544 | 11/1963 | Learmont | 214/77 R |
| 3,072,271 | 1/1963 | Costello | 214/77 R |
| 2,730,249 | 1/1956 | Edwards | 214/75 H |

Primary Examiner—Robert J. Spar
Attorney—Price, Heneveld, Huizenga & Cooper

[57] ABSTRACT

An inverted U-shaped frame is pivotally connected to the floor of a trailer having a pair of side walls and an open rear end. A pair of support arms are swingably attached at one end to the cross bar and to a load supporting platform at the other end so that when the frame is rotated in an arc, the platform is movable between a first position wherein it is supported by and recessed in the trailer floor to a second position where it is supported by a surface exterior of the trailer, the platform remaining level at all times due to the rotation of the arms about the cross bar. The platform when supported in the vehicle is flushed with the floor. Means are connected to the frame to provide positive movement of the frame and support platform.

14 Claims, 7 Drawing Figures

PATENTED OCT 30 1973 3,768,671

INVENTOR.
GORDON LA VIER
BY *Price, Heneveld,*
*Huizenga & Cooper*
ATTORNEYS

3,768,671

LOADING DEVICE

BACKGROUND OF INVENTION

In the trucking industry, the speed and efficiency with which one can load or unload a semi-truck-trailer is many times the key factor in the profitability of the business. Existing techniques normally are adequate enlarged warehouses where a truck can be backed up to a loading dock which is flushed with the floor of a truck-trailer. However, such docks are infrequent when it comes to unloading the trailer at distribution points. For example, in the food grocery distribution system, the final destination of many of the loads are generally small to medium size grocery stores or food markets wherein the loads must be unloaded from an elevated truck floor to a lower or ground level dock surface. Physically unloading such loads by manual means is inadequate in terms of both time and labor costs. However, the existing alternatives are also inadequate in that present equipment providing for mechanical or electromotively operated mechanical loaders and unloaders are too bulky, heavy and expensive. The bulkiness of present apparatus reduces the effective load which can be carried or necessitate the expanded trailer which is equally expensive. Also, the weight of present apparatus likewise reduces the useful or pay load even in most cases where room is available. For example, an apparatus known in the prior art which weighs 6,000 pounds and costs roughly $9000.00 is both too expensive and heavy. Due to state and federal load regulations on today's highways a reduction in useful load of 6,000 pounds cannot be tolerated.

Other proposals utilize tailgate lifts which do not affect the loading space availabe per se. However, these proposals are inadequate in that the structural reinforcement necessary to support loads suspended from behind the vehicle make such equipment too heavy and too expensive.

SUMMARY OF INVENTION

It is a principle object of this invention to provide a loading apparatus which will pick up or deposit a load positioned at ground level and deposit it in the rear end of a semi-trailer-truck. In addition, it is a principal object to provide such a loading apparatus which will add no more than approximately a thousand pounds in weight to the trailer and which will cost far less than existing equipment.

For achievement of these and other objects, a generally inverted U-shape frame comprising a pair of legs and cross bar is pivotally connected at the lower end of the legs to the floor of a vehicle. Load support means are swingably and removably mounted to the cross bar so that when the frame is pivoted, the support means is movable between a first position wherein support means is supported by the vehicle floor to a second position wherein the support means is supported exterior of the vehicle. The support means remains level at all times during movement due to the rotation of the support means about the cross bar. In a preferred aspect, a cable and power means is connected to the frame and operable through pulleys to move the frame and support means under positive control between said first and second positions.

Preferably, the power means is electromotive in the frame and support means are movable to an intermediate vertical position between said first and second positions. A stop prevents the frame and support means for moving past this intermediate position without further intervention by the operator.

In the preferred embodiment, the support means is comprised of a pair of armlike members swingably mounted to the cross bar and detachably connected at their opposite ends to a load supporting platform. The trailer floor includes a recess shaped to receive the platform when it is in its first position. In this position, the platform is flush with the floor of the vehicle.

The entire operation of the loading device provided by this invention requires but a single operator and hence greatly reduces the amount of labor required in loading and unloading vehicles such as semi-truck-trailers.

DESCRIPTION OF THE PREFERRED EMBODIMENT

Figure 1:
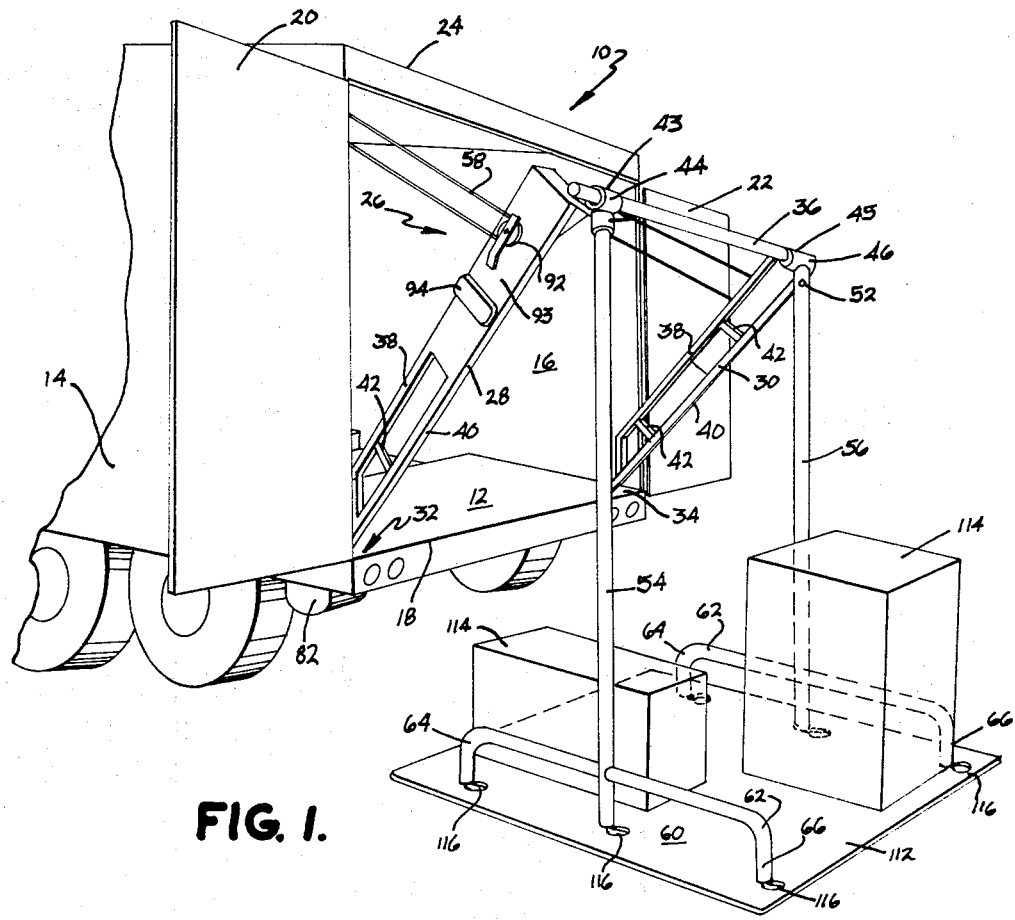
FIG. 1 is a perspective view of one embodiment of the hoisting apparatus provided by this invention.

Referring now to the drawings in detail, FIG. 1 shows the rear end portion 10 of a semi-truck-trailer comprised of a floor 12, sides 14 and 16 and a roof 24. The rear end is opened by swinging out doors 20 and 22 in a conventional manner.

As indicated in the BACKGROUND a primary objective of this invention is to provide a simple and efficient means operable by a single person for lifting a load into or out of the rear end of a truck or semi-trailer and to either receive the load from or deposit it on a loading surface at any height essentially below that of the vehicle floor.

To achieve this, a hoisting frame 26 is shown comprised of a pair of legs 28 and 30 which are pivotally mounted at their lower ends 32 and 34 respectively to the floor bed 12 of the truck so that they may be pivoted in unison about their ends. A cross bar 36 interconnects the upper ends of legs 28 and 30 to form a generally inverted U-shaped frame. The length of leg 28 and 30 is such that when the frame is pivoted through an ark "A" as shown in FIG. 4, the cross bar 36 clears roof 24 when the legs are vertical with respect to the trailer floor.

Preferably, legs 28 and 30 have a minimum lateral thickness and are positioned as close to the sides 14 and 16 of the truck as feasible to present a minimum cross sectional obstruction to movement of objects onto and off of the truck. At the same time, the legs and cross bar must be of sufficient structural strength to support the loads carried thereby. To minimize the weight of the legs, each leg 28 and 30 is preferably constructed of a pair of fore and aft spaced channels 38 and 40 rigidly connected by webbed sections 42. This provides good structural strength and yet minimizes the weight of the structure. Cross bar 36 is preferably tubular steel or piping.

Figures 2, 3:
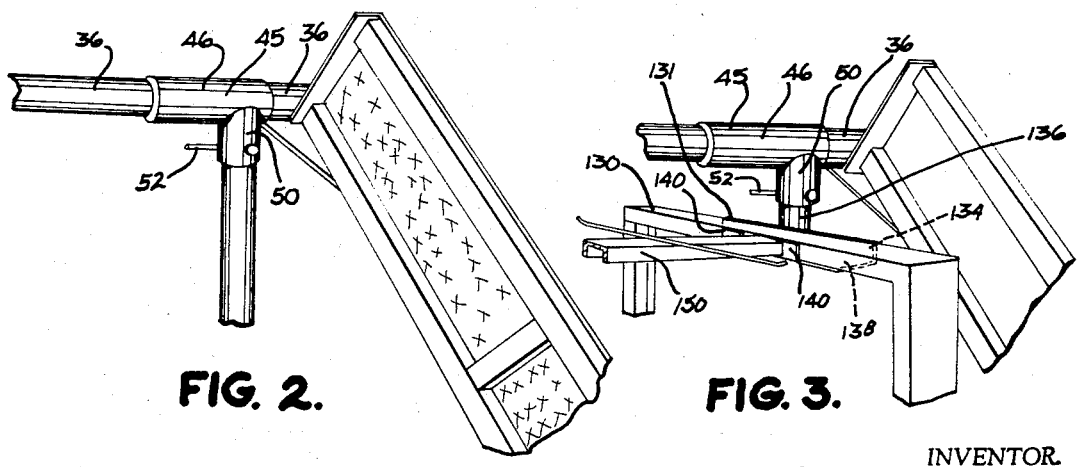
FIG. 2 is a fragmentary perspective view of one of the adapter means provided by this invention.
FIG. 3 is a fragmentary perspective view of an alternative hoisting apparatus.

A pair of spaced load supporting adapters 43 and 45 are shown in FIGS. 1–3 to permit detachably connecting various types of loading means to the hoisting frame 26. Each adapter 43 and 45 is comprised of a bearing 44 and 46 rotatably mounted on cross bar 36. The bearings are adjustable lengthwise of the cross bar to permit adjustment in lateral spacing. Each adapter includes a tubular portion 50 projecting radially with respect to the cross bar axis. The gravitational weight will urge the portion 50 downwards. Tubular portion 50 includes a pin 52 removably mounted therethrough for connecting various load supporting means to each adapter 43 and 45, said means being described in greater detail hereinafter.

Figure 4:
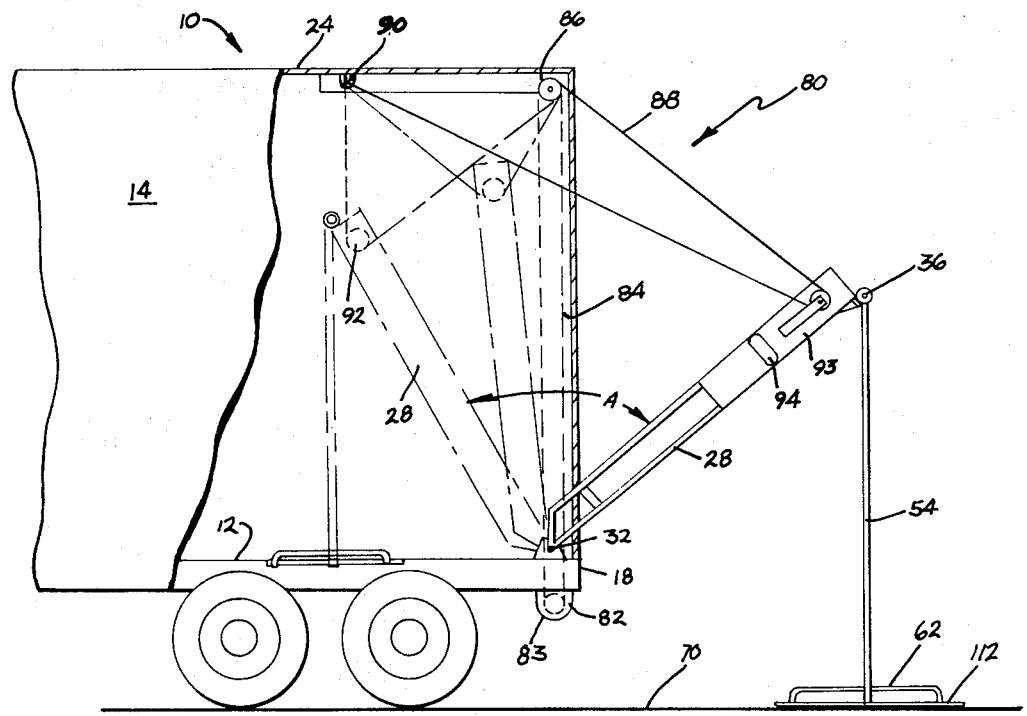
FIG. 4 is a side elevation view of the rear end of a trailer, cut away to show the operation of the cable and power means provided by the invention.

One form of load supporting means is shown in FIGS. 1, 2 and 4 and is comprised of a pair of armlike members 54 and 56 connected to a load supporting platform 60 at their lower ends. The upper ends of arms 54 and 56 are insertable into tubular portions 50 and include openings permitting the insertion of pin 52 to lock the arms to the adapters.

Figure 7:
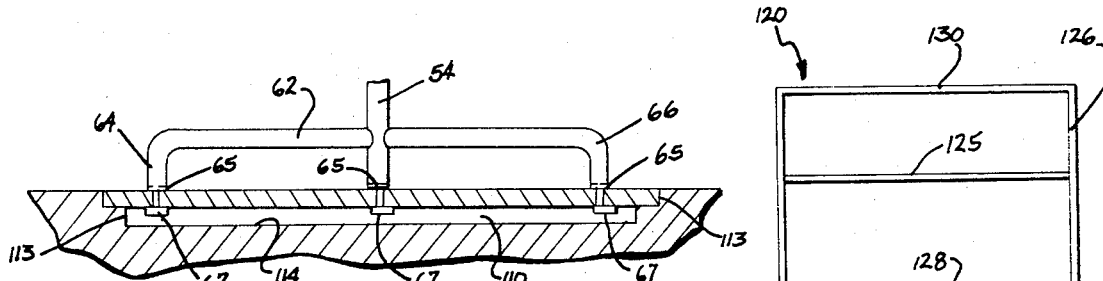
FIG. 7 is a fragmentary cross sectional view of the support platform recessed within the vehicle floor.

To stabilize platform 60 with respect to support arms 54 and 56, a stabilizing bar 62 extends from the lower end of each arm 54 and 56 and is curved downwardly at each end 64 and 66. Referring specifically to FIG. 7, the downwardly curved ends 64 and 66 of the stabilizing bar and the lowermost end of armlike members 54 and 56 include a disc 65 welded thereto. An inverted T-shaped header portion 67 is anchored to the disc and adapted to detachably interlock with a plurality of key-shaped openings 116 provided in platform 60. In this fashion, each of the arms 54 and 56 is secured to plate 60 at at least two points to prevent the platform from pivoting or tipping with respect to the support arms.

Referring to FIGS. 1, 4 and 7, floor 12 is shown having a recess 110 which permits positioning of platform 60 within the recess so that the load supporting surface 112 of the platform is flushed with floor 12. Recess 110 includes a peripheral shoulder 113 which provides the support for platform 60 while at the same time spacing it from the floor 114 of recess 110. In the embodiment shown, the inverted T-shaped headers 67 which fit through key-shaped openings 116 project beneath the lower surface of platform 60. The shoulders 113 of recess 110 act as a stop for the platform to permit easy insertion and removal of arms 54 and 56 from the platform.

The positioning of platform 60 within a recess so that its upper surface 112 is flushed with floor 12 is extremely useful in that it permits one to slide the loads characterized as boxes 114 in FIG. 1 onto or off of the platform without requiring any vertical displacement of the load. The key-shaped openings 116 which cooperate with projections 67 on arms 54 and 56 permit easy insertion and removal of the load supporting arms so that the access opening to the interior portion of the trailer can be increased if desired. Instances may arise wherein it is desirable to position bulkier loads on the rear end portion of the truck which could not be accommodated with the support arms in position. The removability of the arms permit these loads to be accommodated. Another significant advantage of being able to remove the support arms 54 and 56 is that it permits the use of the trailer without the loading apparatus provided by this invention. For example, where the trailer is transporting goods from dock to dock and loaded and unloaded by high-low trucks using pallets, it is essential that the floor bed of the trailer be even. It is also essential that there be no unnecessary obstructions to the ingress and egress of the trailer. In this connection, there will also be times when it is desirable to have the support arms 54 and 56 out of the way when the truck is being loaded at a normal terminal docking area and then install them for use at a distribution point. This invention permits quick and easy removal and insertion of the support arms to the platform 60 or insertion and or removal from cross bar 36 by simply removing pin 52 from adapters 43 and 45.

With support arms 54 and 56 in platform 60 interconnected to frame 26 as described, platform 60 is movable (FIG. 4) from a first position wherein the platform is recessed in and supported by stops 113 (shown in FIG. 7) to a second position wherein the platform is extended over and away from the rear end of the truck and supported by a surface such as the ground 70, or a loading dock surface which lies on a plane below that of the trailer floor. To lift platform 60 from the trailer floor surface, it is necessary that the hoisting frame 26 be moved through an intermediate position. In the intermediate position, legs 28 and 30 are vertical. In this intermediate position, the load and platform is raised above the vehicle floor with arms 54 and 56 likewise being vertical. As such, the mechanism is stable without bias to swing in either direction and by manual or other suitable intervention may be caused to pivot in either direction from this intermediate position. For example, if the platform is to be moved outside the vehicle, it is manually moved outwardly from its intermediate position. This unstabilizes the forces acting on the mechanism and a rearward bias is established. It will be appreciated that in most normal usages, the height of the surface to which the platform is to be lowered exterior of the vehicle is irrelevant as long as it is no higher than the vehicle floor.

To provide positive and controlled movement of the loading and unloading apparatus, the cable and power means 80 are interconnected between frame 26 and the vehicle to provide selective movement of support platform 60 between the first and second positions described. To provide this movement, a motor 82 is mounted beneath the vehicle floor bed at one rear corner thereof and interconnected to a drive sprocket 83 and chain 84 with a sprocket and cable drum 86 aligned above motor 82 at the upper rear corner of the trailer just below roof 24. Operation of motor 82 drives chain 84 for selective and reversible rotation of cable drum 86. A cable 88 is connected at one end to an anchor 90 in close proximity to cable drum 86. The cable passes around pulley 92 which is mounted on the outer side 93 of the upper portion of arm 28 as shown in FIG. 1. Cable 88 passes around pulley 92.

Preferably, the above described cable system is provided at both sides of frame 26. Coordinated operation can be obtained by interconnecting the cables on each side by a shaft extending across the vehicle body beneath the floor (not shown) where it does not reduce head room within the vehicle.

Figure 5:
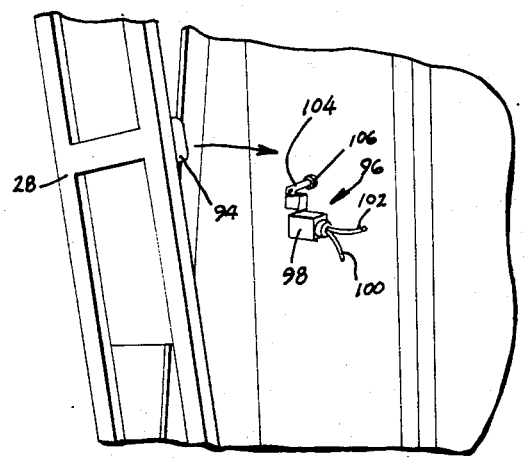
FIG. 5 is a fragmentary perspective view of the stop means provided by this invention.

With frame 26 in the second or rearward position, as shown in solid lines in FIG. 4, rotation of cable drum 86 in a clockwise direction will swing frame 26 and support platform 60 counterclockwise upwardy and forwardly. Upon reaching the intermediate position wherein frame 26 is vertical, it is necessary to reverse the rotational direction of drum 86 to permit lowering of frame 26 into its forward or first position as shown in phantom in FIG. 4. Once frame 26 reaches the intermediate position, continued operation of cable drum 86 will over tension the cable. Thus, the direction of motor 82 must be changed. To automatically stop cable drum 86 when frame 26 reaches a vertical position, a cam block 94 is provided for tripping a solenoid switch means 96 or other type switch when arms 28 and 30 are vertical. Referring specifically to FIG. 5, leg 28 is shown moving in a clockwise direction to the right and as cam block 94 comes into contact with switch means 96, movement of the switch will cause motor 82 to cease running without further intervention. Switch means 96 is shown having a solenoid 98, a pair of lead wires 100 and 102 interconnected to motor 82 in a manual switch therebetween. Solenoid 98 includes a pivot arm 104 and roller 106, the roller 106 acting as a cam follower for closing solenoid 98 by depressing arm 104. Generally, during loading and unloading, the trailer is on a flat horizontal plane. In this case, when frame 26 reaches its intermediate vertical position, it will also be vertical with the truck bed. However, there will be instances when the truck bed is inclined with respect to the earth's surface. In these instances, the intermediate position described above will not coincide with that position wherein the frame is vertical with respect to the truck bed. This situation can be rectified by adjustably mounting switch means 96 for tripping by cam block 94 when frame 26 is vertical.

When frame 26 reaches the intermediate position and the motor is stopped, the operator must then actuate motor 82 for movement of cable drum 86 in the opposite direction for lowering platform 60 into one of said first or second positions.

Since the direction of rotation of cable drum 86 must be changed to permit completion of the pivotal movement of the frame and support means from one of said first and second positions to the other, there will be some slack created on the cable when this change of direction is brought about. The automatic cessation of the operation of motor 82 when the frame reaches the intermediate position is thus desirable from a safety view point also. That is, when the frame comes to rest in the intermediate position and the motor 82 is off, it is generally desirable for the operator to physically push frame 26 slightly in the desired direction to take up the slack present when the frame is in the intermediate position.

It will be appreciated, the operation of cable drum 86 reels in cable 88 when the frame and support means attached thereto are being lifted from either the first or second position and plays out cable 88 when the support frame and support means are being lowered into either one of said first or second positions. When the frame and support means are being lowered from the intermediate position, the gravitational weight of the support means provides the force for lowering the apparatus. However, the control movement of cable drum 86 regulates the speed of the descent. Hence, at all times, the lowering or raising of the support frame 26 and support means as shown by platform 60 is controlled by the operation of motor 82, chain 84, cable drum 86 and cable 88.

Figure 6:
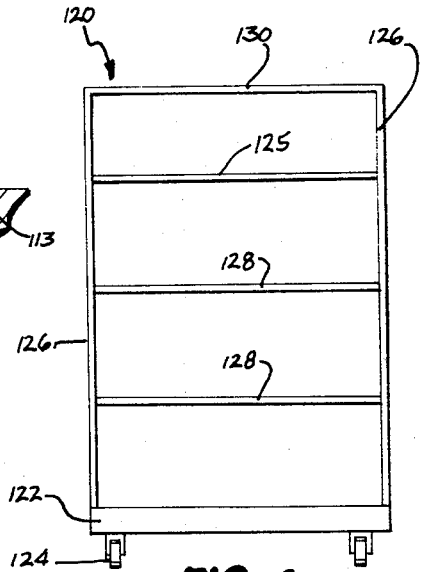
FIG. 6 is an end view of one type of load supporting means carried by this invention.

Turning now specifically to FIGS. 3 and 6, an alternative embodiment of this invention is shown in which the hoisting frame 26 is utilized to lift conventional carts 120 into and out of the vehicle. Carts 120 are conventional and hence not described or shown in detail. However, they are generally comprised of a load supporting platform 122 movable on wheels 124. Preferably, the sides of the platform are opened to facilitate loading and unloading boxes thereon with each end having an upstanding portion 126 suitably supported by cross supports 128 intermediate the bottom platform and the top cross support 130. In some cases intermediate platforms are aligned and spaced vertically with respect with each other, the number of which depends on the type and size of boxes being loaded thereon.

The carts 120, as briefly described, are well known and long used in food warehousing and distribution systems wherein the carts are loaded with various types of grocerys or goods being shipped from the distributing point to the individual food outlet where the carts are loaded and unloaded directly onto the vehicle. This invention provides a quick, simple and efficient means for physically loading a cart onto or off of the vehicle.

A tray-like inner lock 131 is preferably comprised of an L-shaped channel member 132 having a vertical side 134 mounted to a tubular portion 136 which fits into tubular member 50 of adapters 43 and 45 described above. Tube 136 includes one or more holes passing through each side so that pin 52 can be inserted therethrough to lock tubes 136 to tubular member 50. On the free end of the horizontal leg 138 of member 131 are one or more vertically extending fingerlike projections 140 which are spaced from and opposed to vertical side 134. The dimensions of L-shape member 131 and fingers 140 are shaped to provide a recess or nesting for the upper cross bar 130 of each end of the cart. To insert cross bar 130 of the cart onto tray 131, one simple operation is to wheel the cart into position so that it is generally aligned beneath cross bar 36 of the hoist and then push the trays 131 into nesting engagement with cross bars 130 from beneath. By sliding adapters 43 and 45 into proper alignment over each end of the cart, tube 136 will telescope within adapter portion 50 to permit insertion of pin 52. Once locked into place, the apparatus will operate as previously described to pick the cart up off the ground if it is in the second position defined and move it into the first position or vice versa. The slidng adjustment of adapters 44 and 46 permit various sized carts to be easily lifted onto and off from the same load.

It will be appreciated that the carts can be modified to carry hanging beef by providing a cross beam 150 between each upper cross bar support 130 as shown in FIG. 3. By properly spacing the two fingerlike projections 140, 140, member 131 is flexible for use with or without a cart with a top cross beam 150.

Although but two embodiments have been shown and described in detail, it will be obvious to those having ordinary skill in this art that the details of construction of these particular embodiments may be modified in a great many ways without departing from the unique concepts presented. It is therefore intended that the invention is limited only by the scope of the appended claims rather than by particular details of construction shown, except as specifically stated in the claims.

I claim:

1. An apparatus for unloading articles from a vehicle having a pair of side walls, a floor and an opening in the side or rear end comprising, in combination: a generally inverted U-shaped frame comprising a pair of legs and cross bar, said legs pivotally mounted to said floor adjacent said side walls and rear end, said cross bar being spaced from said floor a distance less than the height of said sides when said legs are in a vertical position; adapter means rotatably mounted to said cross bar, said adapter means being movable longitudinally along said bar to permit adjustment thereof and being comprised of a pair of bearing members spaced longitudinally along said cross bar and having a tubular portion extending downwardly; load support means removably mounted to said adapter means, said tubular portion including means for removably connecting said support means thereto; said frame being pivotable between a first position wherein said support means is supported by said floor to a second position exterior of the vehicle and an intermediate position wherein said legs are generally vertical; said support means remaining level at all times due to the rotation of said adapter means about said cross bar and being generally stable when said frame is in said intermediate position; and power means for moving said frame between the limits of its pivotal movements.

2. An apparatus according to claim 1 wherein said support means comprises a pair of generally upstanding arm-like members adapted to detachably connect at their upper end to said adapter means and detachably connected at their lower end to a load supporting platform which is transported by said frame.

3. An apparatus for unloading articles from a vehicle having a pair of side walls, a floor and an open rear end comprising: a generally inverted U-shaped frame having a pair of legs and cross bar, said legs pivotally mounted to said floor adjacent said side walls and rear end, said cross bar being spaced from said floor a distance less than the heights of said sides when said legs are in a vertical position; adapter means rotatably mounted to said cross bar; load support means removably mounted to said adapter means, said load support means having a pair of generally upstanding arm-like members adapted to detachably connect at their upper end to said adapter means and at their lower end to a load supporting platform which is transported by said frame, said frame being pivotable between a first position wherein said support means is supported by said floor to a supported position exterior of the vehicle, said support means remaining level at all times due to the rotation of said adapter means about said cross bar; said vehicle floor including a recessed portion for receipt of said platform when said platform is in said first position, said recess conforming to the overall shape and thickness of said platform so that when said platform is positioned therein, the upper surface of said platform is flush with the trailer floor to permit facile movement of loads onto and off from said platform; and power means for moving said frame between the limits of its pivotal movements.

4. An apparatus according to claim 3 wherein said recess includes an indexing stop means engageable with said platform to position said platform flush with said floor.

5. An apparatus according to claim 1 wherein said adapter means further includes a tray-like member detachably connected to said tubular portions of said bearing members, said tray-like member having side portions and an open top, said tray member being adapted to receive and hold a portion of said support means, said support means having a pair of spaced cross members receivable in said tray-like member so that said support means can be lifted by said frame and power means between said first and second positions.

6. An apparatus according to claim 5 wherein said support means is comprised of a cart with upstanding ends, each end including one of said cross members adapted to be positioned in said tray-like member to secure said cart to said frame for loading and unloading said cart, said cart being detachable from said frame and tray-like member and having wheels to permit easy movement about said floor or surface.

7. In an improved hoisting apparatus for transferring articles into and out of a vehicle through an opening in the side or rear thereof, said apparatus having an inverted generally U-shaped frame pivotally secured at its lower end to said vehicle; load support means depending from the top of said frame and pivotally secured thereto whereby it can maintain a vertical position in all pivotal positions of said frame; the improvement comprising: a load supporting platform detachably secured to the lower ends of said load supporting means, a recess in the floor of said vehicle for receiving said platform, and means in said recess for supporting said platform generally flush with the floor of said vehicle.

8. The improved hoisting apparatus according to claim 7 wherein said load supporting means includes a stabilizing portion projecting fore and aft from the lower portion of said means, said each of said stabilizing portions including at least two interconnect means for detachably connecting said platform to said support means.

9. An improved apparatus according to claim 8 wherein said platform includes one or more key-hole shaped openings cooperable with projection portions on said stabilizing portions which projection portions are insertable through and into said key-hole openings to detachably lock said platform to said support means or permit removal therefrom.

10. In an improved hoisting apparatus for transferring articles into and out of a vehicle through an opening in the side or rear thereof, said apparatus having an inverted generally U-shaped frame pivotally secured at its lower end to said vehicle; load support means depending from the top of said frame and pivotally secured thereto whereby it can maintain a vertical position in all pivotal positions of said frame; the improvement comprising: power means interconnected between said frame and vehicle to move said frame and load support means between a first position wherein said support means is supported by the floor of said vehicle to a second position exterior of the vehicle, and an intermediate position between said first and second positions wherein said generally U-shaped frame is vertically oriented so that loads supported thereon is generally stable, said power means including a stop means which prevents said frame and load support means from moving through said intermediate position without further intervention by the operator.

11. An improved hoisting apparatus according to claim 10 wherein said power means is electromotove and said stop means is an electric switch operated by a cam follower which is actuated by cam means on said frame which engages said follower when said frame is brought into said intermediate positions.

12. An improved hoisting apparatus according to claim 10 wherein said power means includes a rotatable drum mounted to said vehicle adjacent the top of said opening, said drum being chain driven; a cable anchored at one end to said vehicle adjacent the top of said opening in close proximity to said drum, said cable being threaded through a pulley means mounted on the upper end of one side of said generally U-shaped frame, said cable being wound through said rotating drum so that when said drum is rotated, said frame is positively moved toward and away from said intermediate position toward or away from each of said first of second position.

13. An apparatus for unloading articles from a vehicle having a pair of side walls, a floor and an open rear end comprising: a generally inverted U-shaped frame comprising a pair of legs and cross bars, said legs being mounted to said floor adjacent said side walls in rear end, said cross bar being spaced from said floor a distance less than the heights of said sides when said legs are in a vertical position; adapter means rotatably mounted to said cross bar; load supports removably mounted to said adapter means, said frame being pivotable between a first position wherein said support means is supported by said floor to a second position exterior of the vehicle and a position intermediate said first and second positions wherein said legs are in a vertical orientation, said support means remaining level at all times due to the rotation of said adapter means about said cross bar; and power means for moving said frame between the limits of its pivotal movements, said power means including a stop means which prevents said frame and support means from moving past said intermediate position after once reaching said intermediate position without further intervention by the operator.

14. An apparatus according to claim 13 wherein said power means is electromotive and said stop means is an electric switch operated by a cam follower which is actuated by cam means on said frame which engages said follower when said frame is brought into said intermediate position.

* * * * *